US 12,263,465 B2

United States Patent
Alneyadi et al.

(10) Patent No.: US 12,263,465 B2
(45) Date of Patent: Apr. 1, 2025

(54) TAILORING NEW COVALENT ORGANIC FRAMEWORK FOR HIGHLY EFFICIENT IODINE CAPTURE

(71) Applicant: UNITED ARAB EMIRATES UNIVERSITY, Al Ain (AE)

(72) Inventors: Shaikha Alneyadi, Al Ain (AE); Mohammed Taleb Khamis Alhassani, Al Ain (AE); Ali Saeed Saif Aleissaee, Al Ain (AE); Abdullah Ayman Khalaf, Al Ain (AE); Abdulrahman Abdullah Alhaj Alteneiji, Al Ain (AE); Sultan Ali Jama, Al Ain (AE); Yaser Yushi Yaser Alyaarbi, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/227,807

(22) Filed: Jul. 28, 2023

(65) Prior Publication Data
US 2025/0033025 A1    Jan. 30, 2025

(51) Int. Cl.
| | | |
|---|---|---|
| *B01J 20/22* | (2006.01) |
| *B01D 15/20* | (2006.01) |
| *B01D 53/68* | (2006.01) |
| *B01D 53/96* | (2006.01) |
| *B01J 20/30* | (2006.01) |
| *B01J 20/34* | (2006.01) |
| *C07F 9/659* | (2006.01) |
| *G21F 9/02* | (2006.01) |
| *G21F 9/12* | (2006.01) |

(52) U.S. Cl.
CPC .......... *B01J 20/226* (2013.01); *B01D 15/203* (2013.01); *B01D 53/685* (2013.01); *B01D 53/96* (2013.01); *B01J 20/3078* (2013.01); *B01J 20/3085* (2013.01); *B01J 20/3425* (2013.01); *B01J 20/3475* (2013.01); *C07F 9/659* (2013.01); *G21F 9/02* (2013.01); *G21F 9/12* (2013.01); *B01D 2253/204* (2013.01); *B01D 2257/202* (2013.01)

(58) Field of Classification Search
CPC .. B01J 20/226; B01J 20/3078; B01J 20/3085; B01J 20/3425; B01J 20/3475; B01D 15/203; B01D 53/685; B01D 53/96; C07F 9/659; G21F 9/02; G21F 9/12
See application file for complete search history.

(56) References Cited

FOREIGN PATENT DOCUMENTS

| | | |
|---|---|---|
| CN | 112090413 A | 12/2020 |
| CN | 113501921 A | 10/2021 |

OTHER PUBLICATIONS

Yang et al., "Molecular Iodine Capture by Covalent Organic Frameworks", Molecules. Dec. 2022; 27(24): 9045.

(Continued)

*Primary Examiner* — James A Fiorito
(74) *Attorney, Agent, or Firm* — Nath, Goldberg & Meyer; Joshua B. Goldberg

(57) ABSTRACT

The phosphazene covalent organic framework (COF) is a material with high efficiency to improve the removal of iodine from nuclear waste. The COF can be obtained by a solvothermal reaction of hexa (4-formyl-phenoxy)cyclotriphosphazene and 1,3,6,8-tetra(aminophenyl)pyrene. The resulting three-dimensional phosphazene COF has iodine uptakes as high as 9.4 g g$^{-1}$ due to its 3D framework with higher specific surface areas and interconnected channels.

12 Claims, 7 Drawing Sheets

(56) References Cited

OTHER PUBLICATIONS

Zhao et al., "Synthesis of Pillar[5]arene- and Phosphazene-Linked Porous Organic Polymers for Highly Efficient Adsorption of Uranium", Molecules 2023, 28(3), 1029.

Zhang et al., ""Stereoscopic" 2D super-microporous phosphazene-based covalent organic framework: Design, synthesis and selective sorption towards uranium at high acidic condition", Journal of Hazardous Materials, vol. 314, Aug. 15, 2016, pp. 95-104.

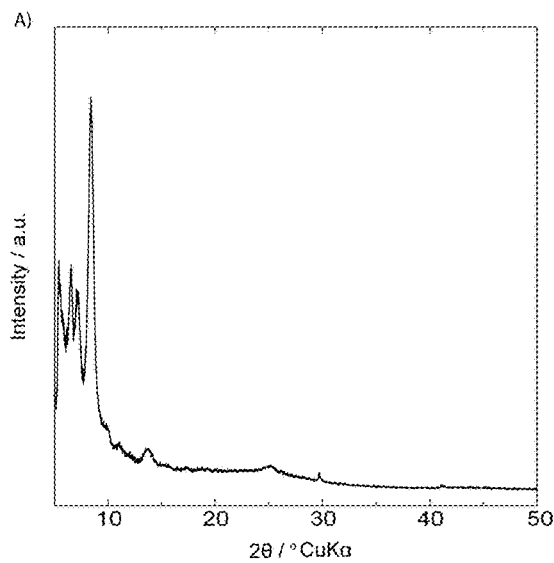
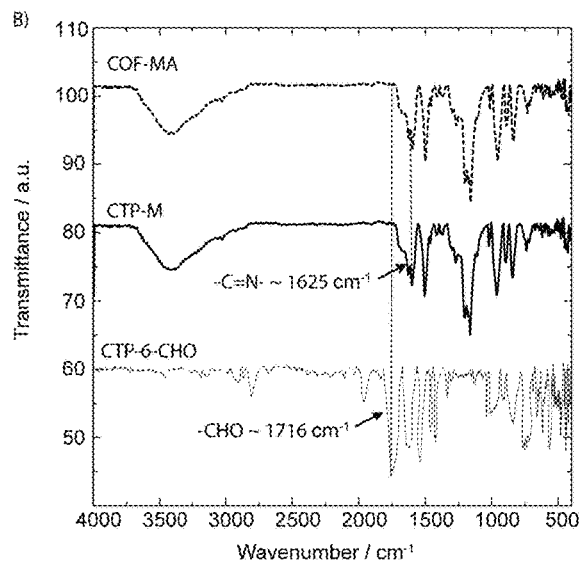
FIG. 1A  FIG. 1B
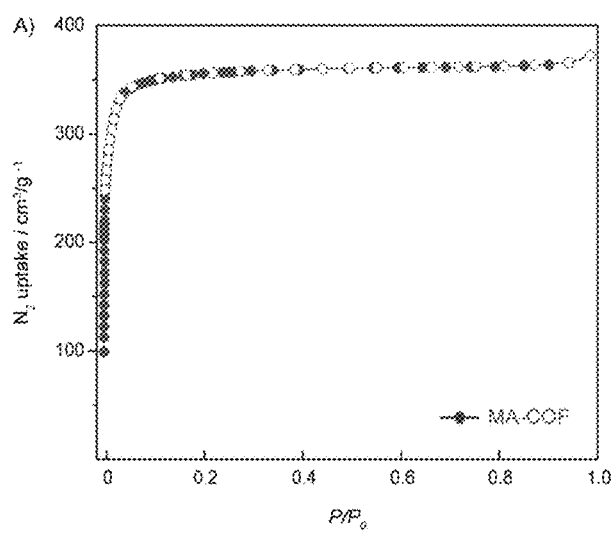
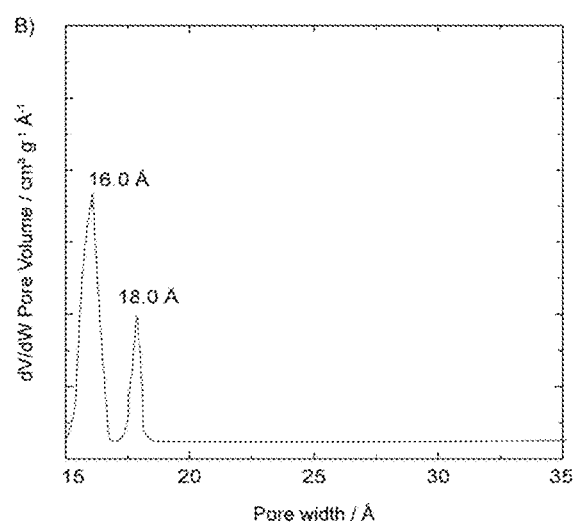
FIG. 2A  FIG. 2B

TAILORING NEW COVALENT ORGANIC FRAMEWORK FOR HIGHLY EFFICIENT IODINE CAPTURE

BACKGROUND

Field

The disclosure of the present patent application relates to a covalent organic framework (COF), and particularly to a phosphazene covalent organic framework (COF) material with high efficiency for the removal of iodine from nuclear waste.

Description of Related Art

Nuclear energy has many benefits over other sources of energy. Compared to fossil fuels, which generate enormous amounts of $CO_2$, $SO_x$, $NO_x$, and particulate matter, renewable energy sources have a higher energy density and are more environmentally friendly at the point of use. In 2020, 440 nuclear reactors were estimated to produce 10% of the world's electricity using uranium, which has an energy density seven orders of magnitude higher than that of coal or gasoline. This is projected to increase over the coming decade. However, managing radioactive waste is a difficult problem because improper handling or disposal can result in the unintended release of radionuclides, which poses serious risks to human health and long-term environmental contamination.

Iodine, a volatile byproduct of uranium fission, has a long half-life, high fluidity, and strong radioactivity, all of which pose risks to both the environment and the human body. Therefore, the development of safe, effective, and affordable storage facilities for iodine waste is urgently needed.

Covalent organic framework (COF) has a controlled pore structure and a large specific surface area and thus demonstrates great opportunities in the field of radioactive iodine adsorption. However, a suitable COF material has yet to be provided.

Thus, a suitable material for removing and storing an iodine by-product of uranium fission solving the aforementioned problems is desired.

SUMMARY

The present subject matter relates to the preparation of a phosphazene covalent organic framework (COF) material with high efficiency to improve the removal of iodine from nuclear waste. In an embodiment, the COF can be obtained by a solvothermal reaction, and the obtained product can be characterized by SEM, FT-IR, TGA, and nitrogen adsorption-desorption analysis. The new COF (MA-COF) is a suitable candidate for radioiodine capture from nuclear waste.

In an embodiment, the present subject matter relates to a method for making a phosphazene covalent organic framework (MA-COF) comprising: obtaining a hexa (4-formyl-phenoxy)cyclotriphosphazene having the formula:

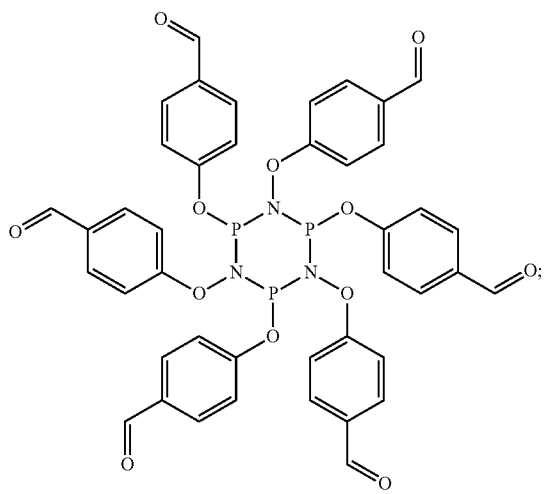 [SMILES: O=Cc1ccc(ON2P(Oc3ccc(C=O)cc3)N(Oc3ccc(C=O)cc3)P(Oc3ccc(C=O)cc3)N(Oc3ccc(C=O)cc3)P2Oc2ccc(C=O)cc2)cc1]

obtaining a 1,3,6,8-tetra(aminophenyl)pyrene having the formula:

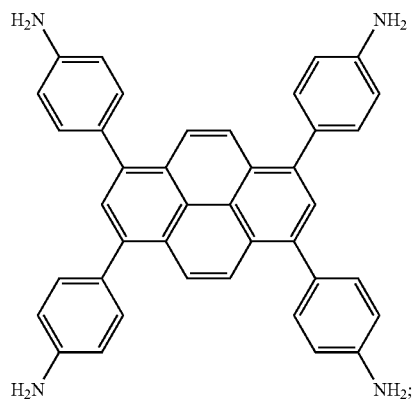 [SMILES: Nc1ccc(-c2cc(-c3ccc(N)cc3)c3ccc4c(-c5ccc(N)cc5)cc(-c5ccc(N)cc5)c5ccc2c3c54)cc1]

placing the hexa(4-formyl-phenoxy)cyclotriphosphazene and the 1,3,6,8-tetra(aminophenyl)pyrene in separate vessels, then adding a solvent to each respective vessel and sonicating each respective vessel to obtain a hexa(4-formyl-phenoxy)cyclotriphosphazene homogenous dispersion and a 1,3,6,8-tetra(aminophenyl)pyrene homogenous dispersion; adding the hexa(4-formyl-phenoxy)cyclotriphosphazene homogenous dispersion to the vessel containing the 1,3,6,8-tetra(aminophenyl)pyrene homogenous dispersion to obtain a suspension in the vessel containing the mixture of the 1,3,6,8-tetra(aminophenyl)pyrene homogenous dispersion and the hexa(4-formyl-phenoxy)cyclotriphosphazene homogenous dispersion; adding acetic acid and leaving the mixture in autoclave undisturbed for at least about 7 days at a temperature of about 110° C. to about 130° C. to obtain a solid; and collecting the solid by filtration and drying the solid to obtain the phosphazene covalent organic framework (MA-COF) having the formula:

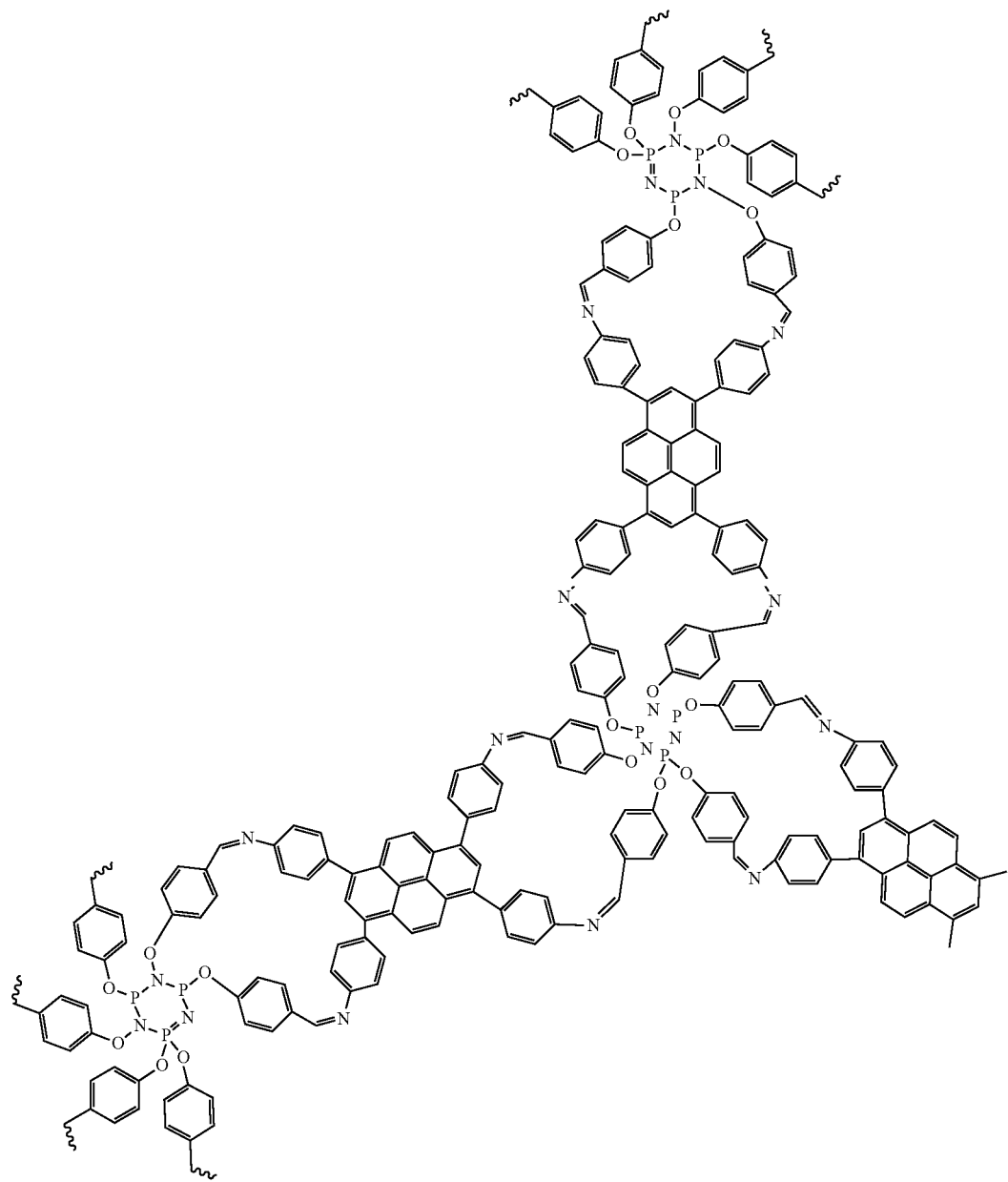
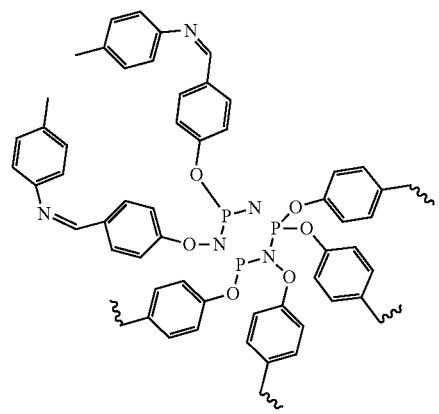

In another embodiment, the present subject matter relates to a phosphazene covalent organic framework (MA-COF) having the formula:
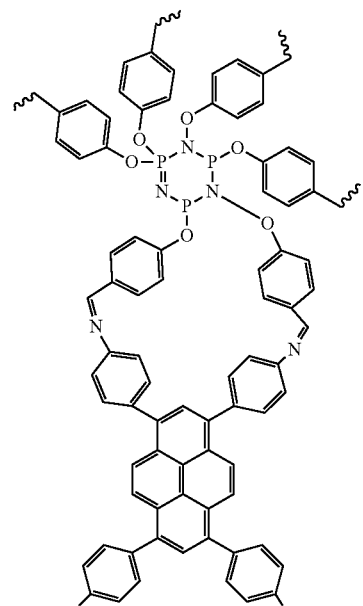
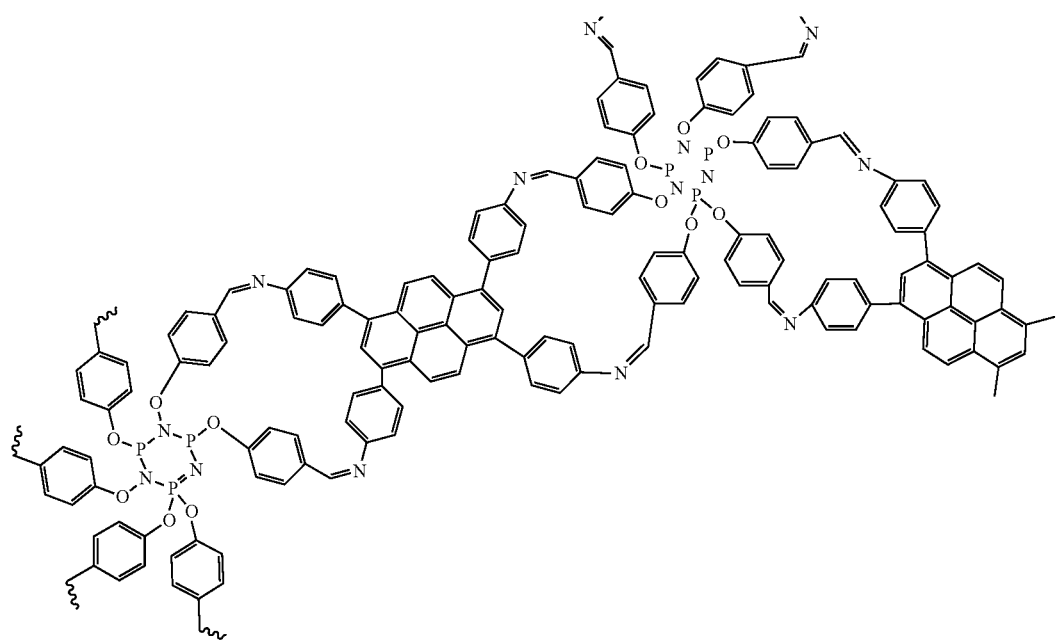

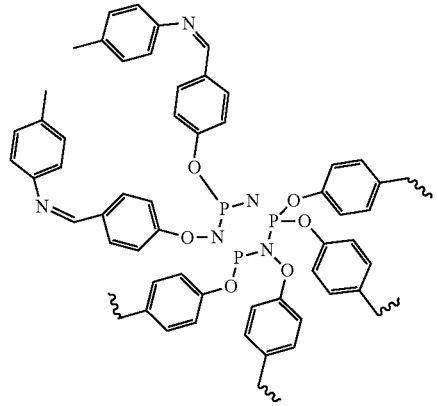

In a further embodiment, the present subject matter relates to a method for removing iodine from a solid, liquid, or vapor, the method comprising: contacting the phosphazene covalent organic framework (MA-COF) with an iodine-containing solid, liquid, or vapor; and adsorbing the iodine from the iodine-containing solid or vapor onto the phosphazene covalent organic framework (MA-COF).

These and other features of the present subject matter will become readily apparent upon further review of the following specification.

BRIEF DESCRIPTION OF DRAWINGS

FIG. 1A shows a PXRD analysis of MA-COF.

FIG. 1B shows a FT-IR analysis of MA-COF.

FIG. 2A shows the porosity of MA-COF as determined by $N_2$ adsorption and desorption isotherms at 77 K.

FIG. 2B shows a pore size distribution curve for MA-COF.

Similar reference characters denote corresponding features consistently throughout the attached drawings.

DETAILED DESCRIPTION

Figure 3A:
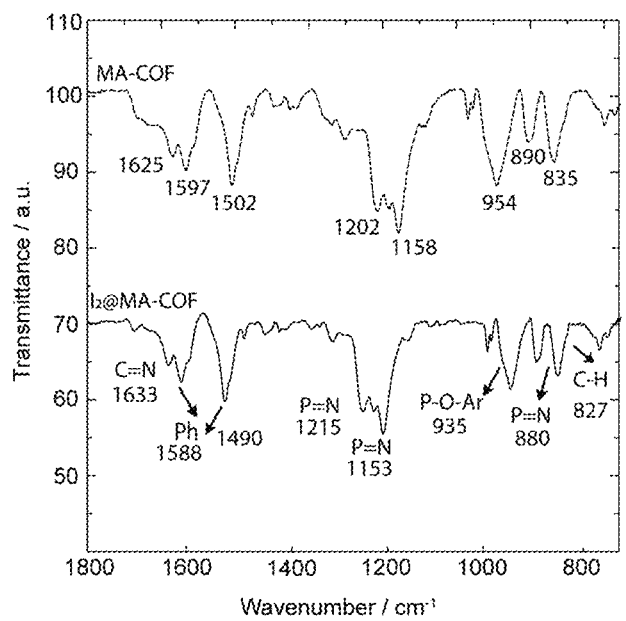
FIG. 3A shows a FTIR spectra comparison of MA-COF with that of $I_2$@MA-COF.
Figure 3B:
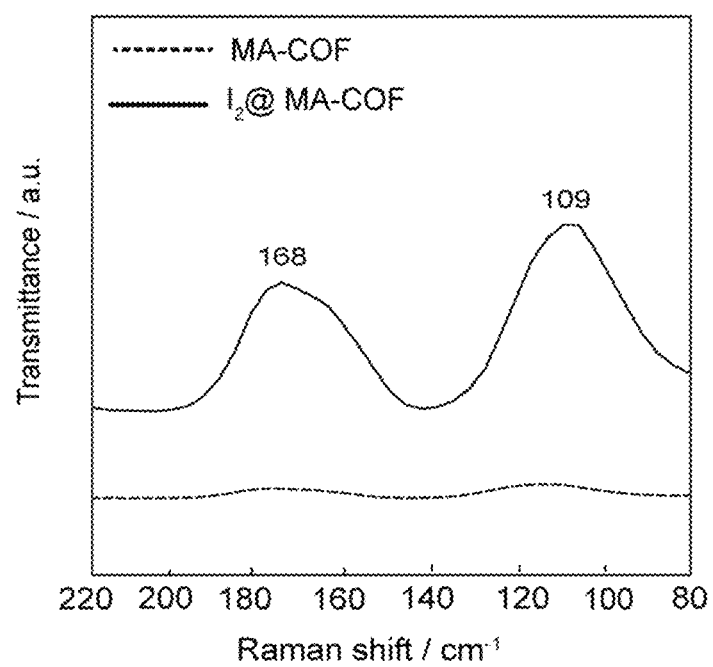
FIG. 3B shows a Ramen spectra comparison of MA-COF with that of $I_2$@MA-COF.

The following definitions are provided for the purpose of understanding the present subject matter and for construing the appended patent claims.

Definitions

Throughout the application, where compositions are described as having, including, or comprising specific components, or where processes or methods are described as having, including, or comprising specific process steps, it is contemplated that compositions of the present teachings can also consist essentially of, or consist of, the recited components, and that the processes or methods of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to the preparation of a phosphazene covalent organic framework (COF) material with high efficiency to improve the removal of iodine from nuclear waste. In an embodiment, the COF can be obtained by a solvothermal reaction, and the obtained product can be characterized by SEM, FT-IR, TGA, and nitrogen adsorption-desorption analysis. The new COF (MA-COF) is a suitable candidate for radioiodine capture from nuclear waste.

In an embodiment, the present subject matter relates to a method for making a phosphazene covalent organic framework (MA-COF) comprising: obtaining a hexa (4-formyl-phenoxy)cyclotriphosphazene having the formula:

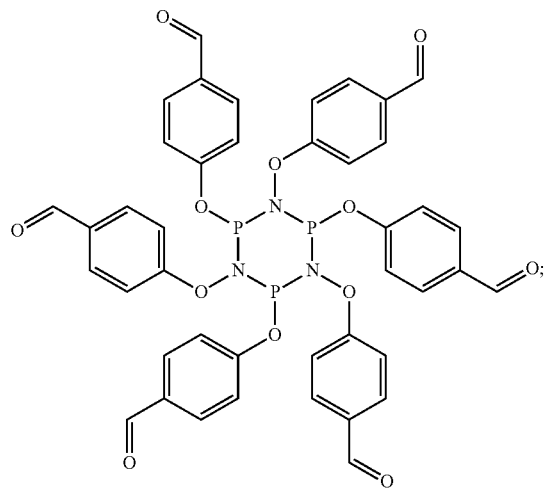 [SMILES: O=Cc1ccc(ON2P(Oc3ccc(C=O)cc3)N(Oc3ccc(C=O)cc3)P(Oc3ccc(C=O)cc3)N(Oc3ccc(C=O)cc3)P2Oc2ccc(C=O)cc2)cc1]

obtaining a 1,3,6,8-tetra(aminophenyl)pyrene having the formula:

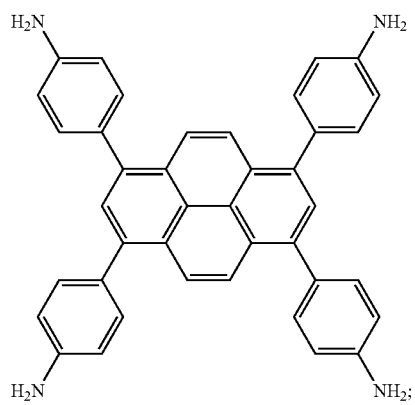 [SMILES: Nc1ccc(-c2cc(-c3ccc(N)cc3)c3ccc4c(-c5ccc(N)cc5)cc(-c5ccc(N)cc5)c5ccc2c3c54)cc1]

placing the hexa(4-formyl-phenoxy)cyclotriphosphazene and the 1,3,6,8-tetra(aminophenyl)pyrene in separate vessels, then adding a solvent to each respective vessel and sonicating each respective vessel to obtain a hexa(4-formyl-phenoxy)cyclotriphosphazene homogenous dispersion and a 1,3,6,8-tetra(aminophenyl)pyrene homogenous dispersion; adding the hexa(4-formyl-phenoxy)cyclotriphosphazene homogenous dispersion to the vessel containing the 1,3,6,8-tetra(aminophenyl)pyrene homogenous dispersion to obtain a suspension in the vessel containing the mixture of the 1,3,6,8-tetra(aminophenyl)pyrene homogenous dispersion and the hexa(4-formyl-phenoxy)cyclotriphosphazene homogenous dispersion; adding acetic acid and leaving the mixture in autoclave undisturbed for at least about 7 days at a temperature of about 110° C. to about 130° C. to obtain a solid; and collecting the solid by filtration and drying the solid to obtain the phosphazene covalent organic framework (MA-COF) having the formula:

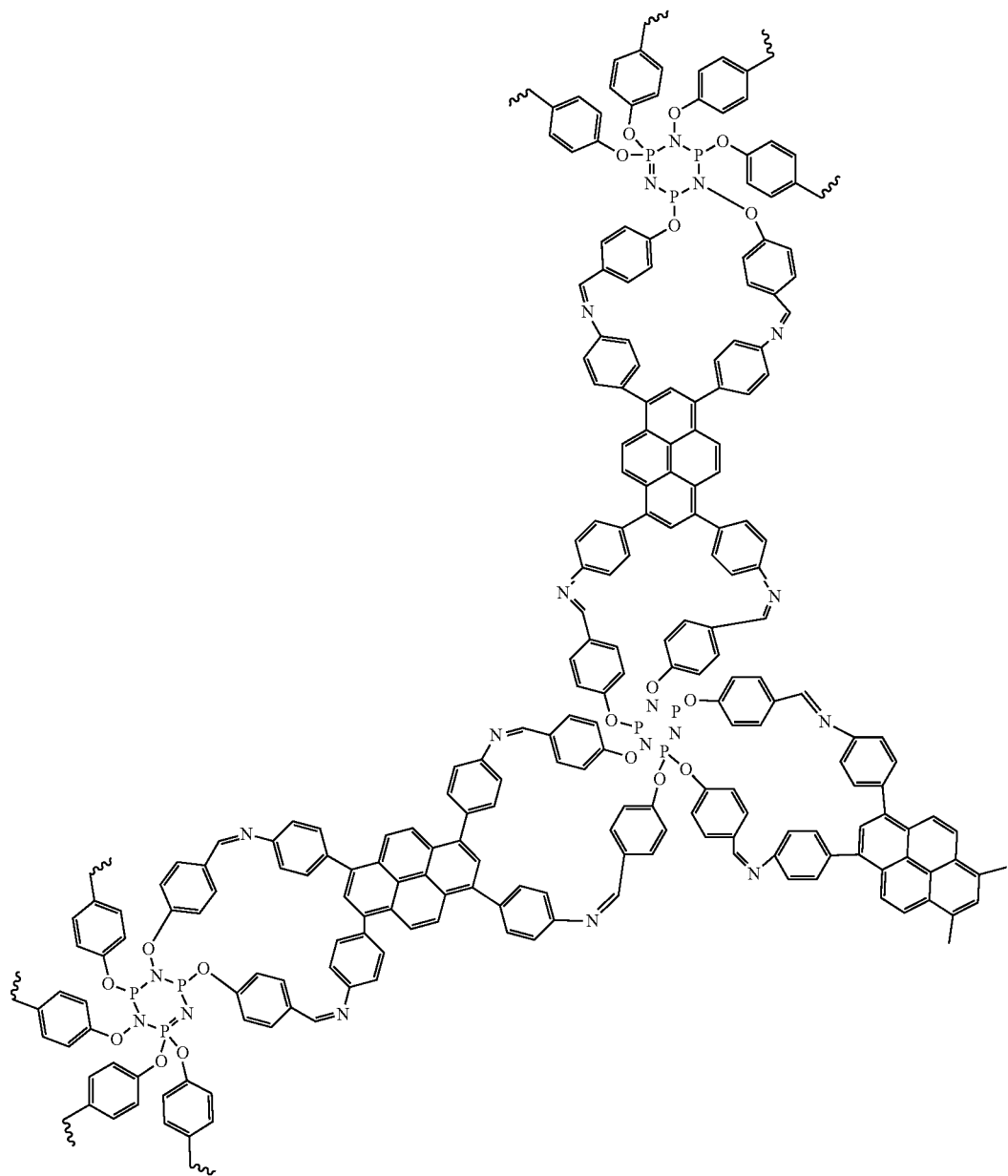
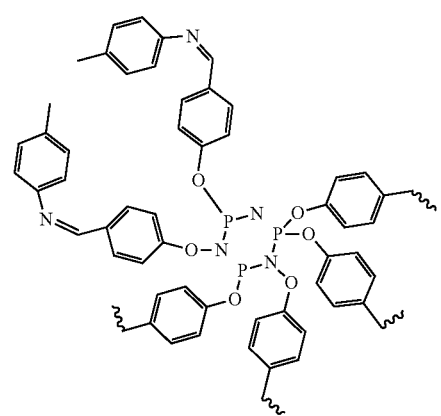

In an embodiment, the hexa(4-formyl-phenoxy)cyclotriphosphazene and the 1,3,6,8-tetra(aminophenyl)pyrene can be used in an about 1:3 molar ratio.

In a further embodiment, after the hexa(4-formyl-phenoxy)cyclotriphosphazene homogenous dispersion is added to the vessel containing the 1,3,6,8-tetra(aminophenyl) pyrene homogenous dispersion and before sealing, acetic acid, for example, can also be added to the vessel containing the mixture of the 1,3,6,8-tetra(aminophenyl)pyrene homogenous dispersion and hexa(4-formyl-phenoxy)cyclotriphosphazene homogenous dispersion In another embodiment of the present methods, the solvent added to the respective vessels can be, by way of non-limiting example, 1,2-dichlorobenzene and n-butanol.

In still another embodiment of the present methods, the solid collected by filtration can be washed with, for example, DMF, acetone, and THE separately before drying. In this regard, the phosphazene covalent organic framework (MA-COF) can be obtained as a yellowish crystalline solid.

In one embodiment of the present methods, the hexa(4-formyl-phenoxy)cyclotriphosphazene can be obtained by reacting p-hydroxybenzaldehyde and hexachlorocyclotriphosphazene. In this regard, the p-hydroxybenzaldehyde and the hexachlorocyclotriphosphazene can be separately dissolved in, for example, acetonitrile before being reacted with each other. In an embodiment, this reaction can be transferred to a microwave vessel at about 140° C. for about 30 minutes.

In a further embodiment of the present methods, the 1,3,6,8-tetra(aminophenyl)pyrene can be obtained by reacting 1,2,6,8-tetrabromopyrene with 4-aminophenylboronic acid pinacol ester. In this regard, the reaction can be conducted by preparing a solution of the 1,3,6,8-tetrabromopyrene and the 4-aminophenylboronic acid pinacol ester with, by way of non-limiting example, $Na_2CO_3$ and $Pd(PPh_3)_4$ in, by way of non-limiting example, 1,4-dioxane and water. In this regard, this reaction can occur while the solution is heated to reflux for about three days.

In another embodiment, the present subject matter relates to a phosphazene covalent organic framework (MA-COF) having the formula:

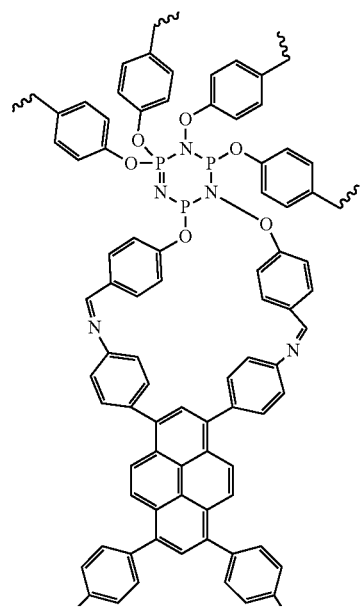

-continued

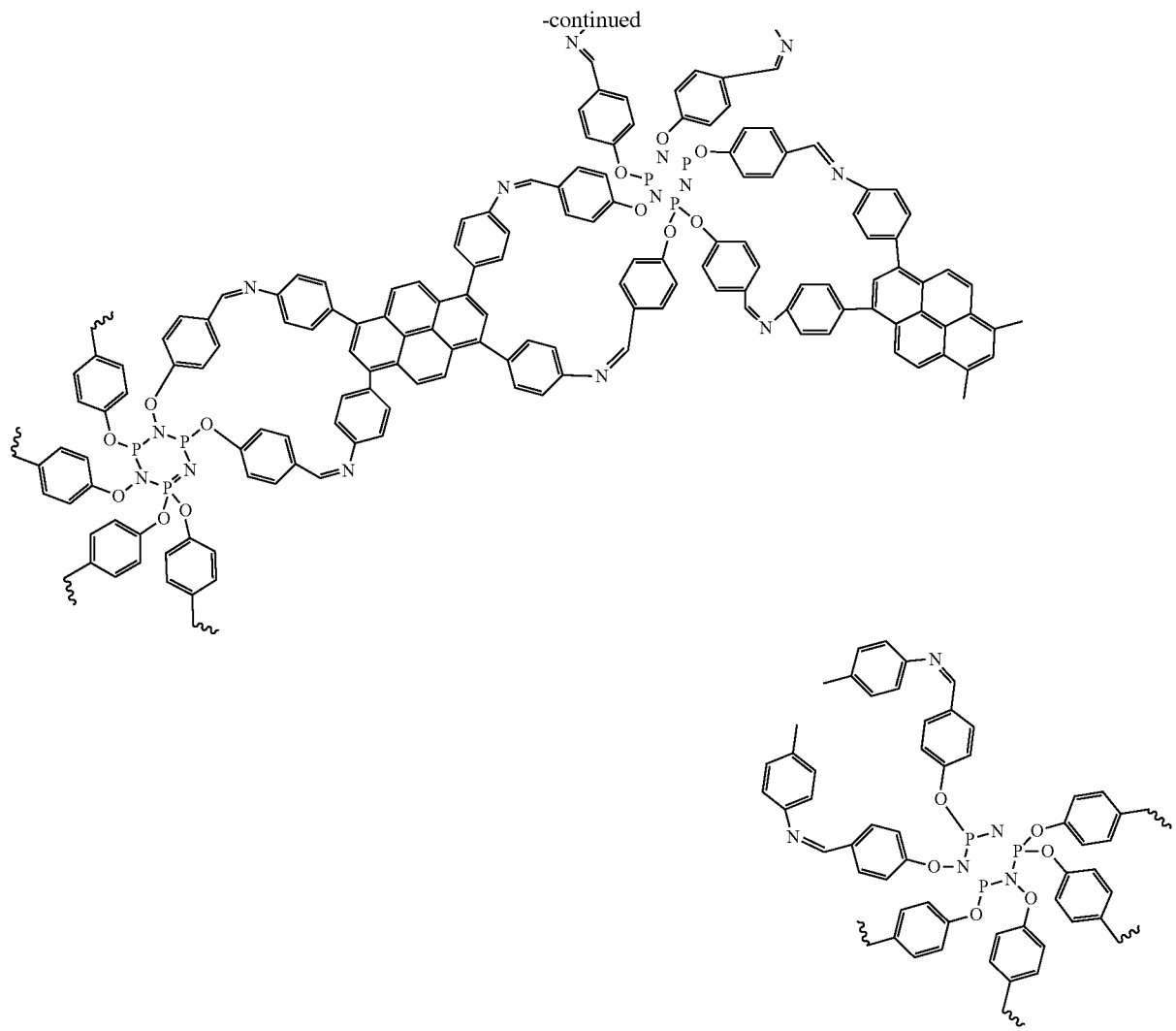

In this regard, the phosphazene covalent organic framework (MA-COF) can be stable in a solvent selected from the group consisting of HCl, NaOH, DMF, DMSO, ethanol, boiling water, and any combination thereof. Further, the phosphazene covalent organic framework (MA-COF) can have an iodine adsorption capacity of 9.4 g g$^{-1}$.

Figure 4A:
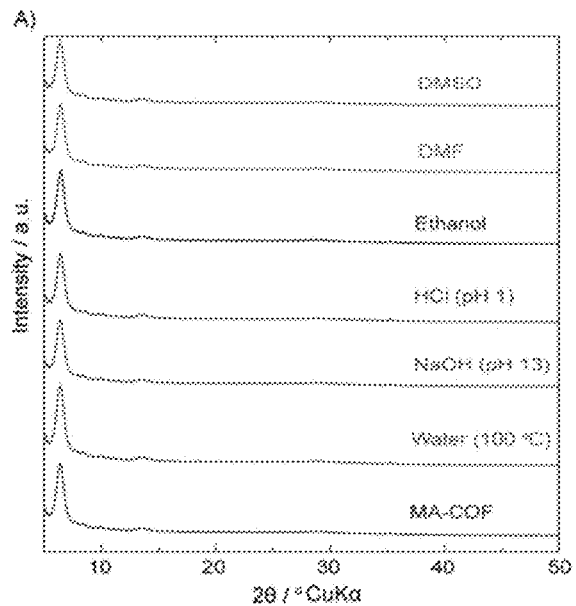
FIG. 4A provides a PXRD diagram demonstrating the solvent stability of MA-COF.
Figure 4B:
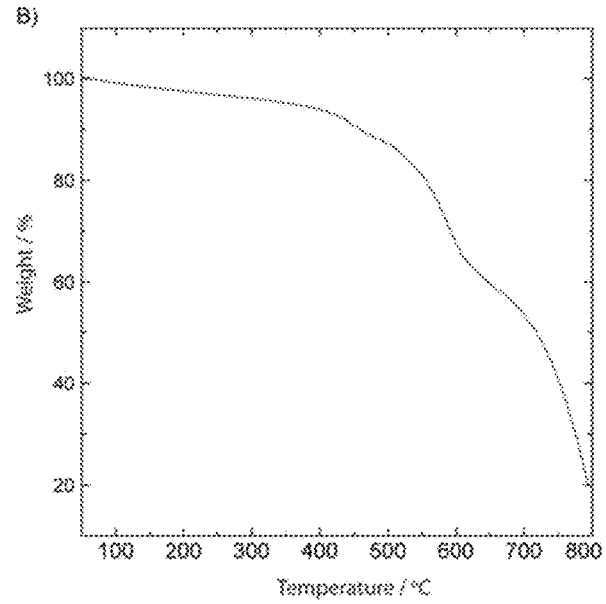
FIG. 4B is a TGA curve of MA-COF.

The MA-COF described above has excellent thermal and chemical stability, as demonstrated by thermogravimetric analysis and PXRD, as shown in FIGS. 4A and 4B. It can be soaked in different solvents (HCl, NaOH, DMF, DMSO, Ethanol and boiling water) for 24 h, and the diffraction peaks remain unchanged after immersion. This indicates that the MA-COF is stable in various solutions. According to the thermogravimetric analysis (TGA-FIG. 4B), the MA-COF does not decompose until 400° C. under nitrogen.

In a further embodiment, the present subject matter relates to a method for removing iodine from a liquid, or vapor, the method comprising: contacting the phosphazene covalent organic framework (MA-COF) with an iodine-containing liquid, or vapor; and adsorbing the iodine from the iodine-containing liquid or vapor onto the phosphazene covalent organic framework (MA-COF).

In an embodiment, the phosphazene covalent organic framework (MA-COF) can remove about 97% of the iodine from the iodine-containing liquid or vapor. In another embodiment, the phosphazene covalent organic framework (MA-COF) is capable of being reused in the method at least five times.

In another embodiment, after the iodine is adsorbed on the phosphazene covalent organic framework (MA-COF), the iodine can be released from the phosphazene covalent organic framework (MA-COF) at an efficiency of about 73% or greater within about 10 minutes. Further, after the iodine is adsorbed on the phosphazene covalent organic framework (MA-COF), the iodine can be released from the phosphazene covalent organic framework (MA-COF) at an efficiency of about 80% or greater within about 60 minutes.

Figure 5A:
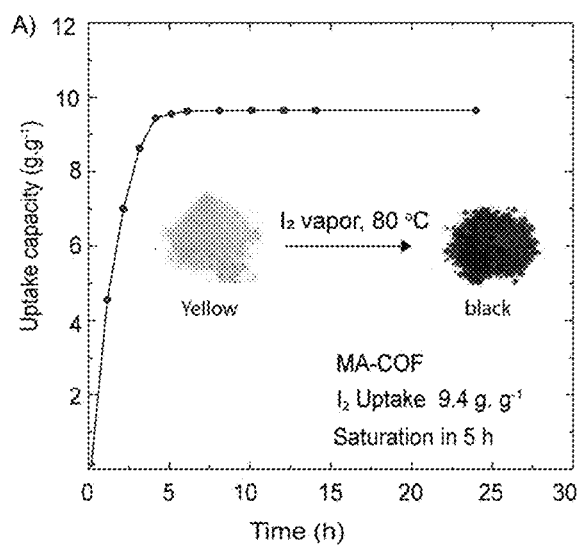
FIG. 5A is a chart showing the gravimetric iodine uptake of MA-COF as a function of time at 80° C. and ambient pressure.
Figure 5B:
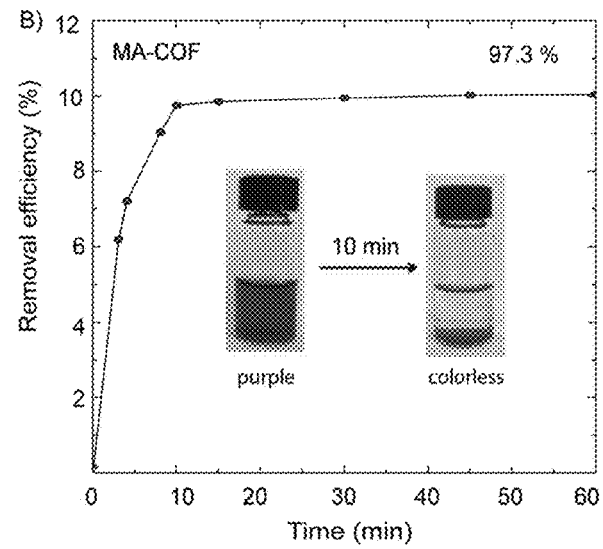
FIG. 5B is a chart showing the rate of iodine adsorption by MA-COF in hexane.
Figure 7A:
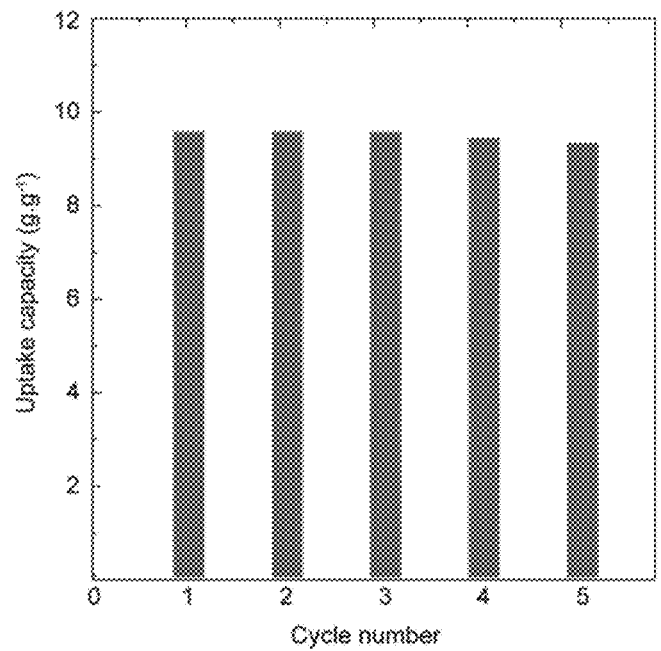
FIG. 7A shows the results of a reusability test of $I_2$@MA-COF for iodine uptake.

In this regard, an iodine adsorption experiment, conducted by exposing MA-COF to iodine vapor at 80° C. under ambient pressure, can be performed to show the ability of MA-COF to adsorb iodine from a substance. As shown in FIGS. 5A and 5B, MA-COF exhibits a quick iodine uptake, showing a nearly linear increment and then reaching adsorption saturation within 5 h. MA-COF shows iodine uptakes as high as 9.4 g g$^{-1}$ due to its 3D framework with higher specific surface areas and interconnected channels. These experiments can be conducted by immersing MA-COF powder into a closed vial containing a pre-prepared iodine elemental n-hexane solution (300 mg L$^{-1}$). The color of the initial solution changes from purple to colorless over time, indicating that MA-COF powder captures iodine from the n-hexane solution. Iodine sorption by MA-COF in I$_2$/cyclohexane solutions studied by UV-vis spectroscopy at room temperature shows an iodine removal efficiency of 97.3%, or about 97%. Notably, the iodine capture capacity of MA-COF does not show any decline after being recycled five times, as shown in FIG. 7A.

Figures 6A, 6B:
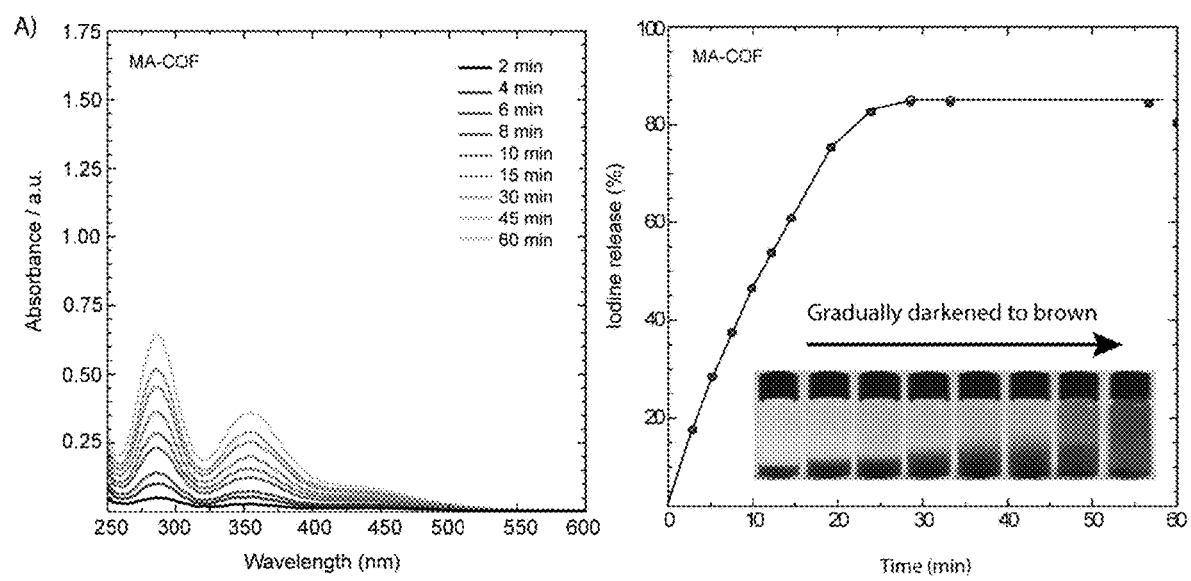
FIG. 6A is a UV-Vis spectra showing the $I_2$ release from $I_2$@MA-COF over time.
FIG. 6B shows an iodine release curve and photographs of the $I_2$ release over time in a 3 mL ethanol solution.

Further, UV-vis spectroscopy can be performed to study iodine release from iodine-loaded samples, as shown in FIGS. 6A and 6B. When black crystals are soaked in anhydrous ethanol, the iodine releases from the channels, and the solution gradually darkens to brown. Iodine release curves of I$_2$@MA-COF show an increasing linear trend, with 73.6% of iodine released rapidly within 10 minutes, and 80.4% within 60 min.

The adsorption capacity of MA-COF (9.4 g g$^{-1}$) is far superior to those reported previously, such as 29-fold higher than that of the typical silver doped zeolite mordenite (Ag-MOR, 0.28 g g$^{-1}$), two orders of magnitude higher than those of nonporous materials, and much better than those of representative porous materials, including zeolitic imidazolate framework-8 (ZIF-8, 1.20 g g$^{-1}$), porous aromatic framework (PAF-24, 2.76 g g$^{-1}$), azo-bridged porphyrin-phthalocyanine network (AzoPPN, 2.90 g g$^{-1}$) as shown in Table 1 below due to the synergistic effect of physical and chemical adsorption of iodine in MA-COF.

TABLE 1

| No. | COFs | BET (m$^2$ · g$^{-1}$) | Iodine uptake (g · g$^{-1}$) |
| --- | --- | --- | --- |
| 1 | MA-COF (This work) | 1135 | 9.4 |
| 2 | PA-TT COF | 48.6 | 5.1 |
| 3 | PB-TT COF | 1305.3 | 5.97 |
| 4 | TTF-TAPT | 461 | 5.02 |
| 5 | JUC-560 | 1815 | 5.2 |
| 6 | JUC-561 | 2359 | 8.19 |
| 7 | TPB-DMTP | 1927 | 6.26 |
| 8 | TTA-TTB | 1733 | 4.95 |
| 9 | Micro-COF-1 | 816 | 2.9 |
| 10 | Micro-COF-2 | 1056 | 3.5 |
| 11 | Meso-COF-3 | 982 | 4 |
| 12 | Meso-COF-4 | 926 | 3.3 |
| 13 | COF-TpgDB | 209.6 | 2.75 |
| 14 | COF-TpgBD | 217.9 | 1.81 |
| 15 | QTD-COF-1 | — | 6.29 |
| 16 | NH2-Th-Bta | 10 | 3.58 |
| 17 | Th-Bta | 22 | 0.68 |
| 18 | TJNU-201 | 2510 | 5.626 |
| 19 | TJNU-202 | 714 | 4.82 |
| 20 | TJNU-203 | 1833 | 5.885 |
| 21 | TJNU-204 | 2048 | 5.335 |
| 22 | TPT-Azine | 1020 | 2.19 |

Accordingly, the MA-COF can establish a new benchmark for the removal of fission waste and highlights the enormous potential of COF as a designable porous material for solving serious pollution problems.

The present teachings are illustrated by the following examples.

EXAMPLES

Example 1

Synthesis of hexa(4-formyl-phenoxy)cyclotriphosphazene

One of the intermediate compounds, hexa(4-formyl-phenoxy)cyclotriphosphazene, can be prepared according to the following Scheme 1:

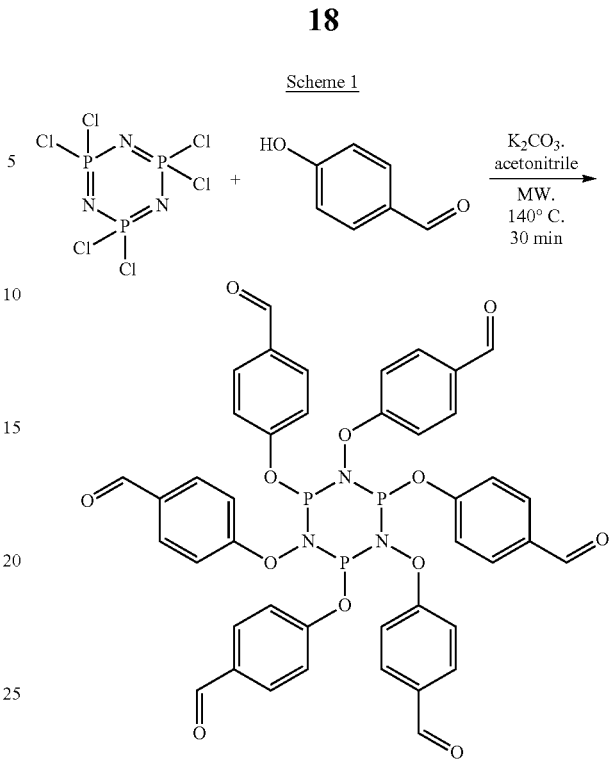

Scheme 1

The reaction depicted in Scheme 1 starts by dissolving 14.92 g p-hydroxybenzaldehyde in 300 mL acetonitrile, 33.4 g potassium carbonate are slowly added to the system, and stirred in an ice bath for 30 min. Then, 50 mL of the hexachlorocyclotriphosphazene (HCCP, 6.96 g) solution dissolved by acetonitrile are slowly added. After 2 hours in an ice bath, the reaction was transferred to a microwave vessel at 140° C. for 30 minutes. After that the reaction ends with filtration, decompression distillation of the filtrate, and the obtained solid will be extracted with dichloromethane and washed with saturated salt water.

The organic phase is dried with anhydrous magnesium sulfate. The white solid is obtained by decompression distillation, and the solid powder is recrystallized in ethyl acetate. The powder is dried at 50° C. under vacuum overnight to obtain hexa(4-formyl-phenoxy)cyclotriphosphazene.

Hexa (4-formyl-phenoxy)cyclotriphosphazene was formed by the condensation of hexachlorocyclotriphosphazene and p-hydroxybenzaldehyde and has a unique stereoscopic structure in which the O—P—O plane (b plane) is perpendicular to the aromatic ring plane of cyclotriphosphazene N$_3$P$_3$ (a plane) (See Scheme 3, below). Because of the unique structure of hexa(4-formyl-phenoxy)cyclotriphosphazene, the as-prepared MA-COFs do not have a traditional 2D planar structure. Theoretically, to realize the construction of MA-COFs with long-range ordered structure, there are mainly two connection configurations between hexa(4-formyl-phenoxy)cyclotriphosphazene and the C4-symmetric linker (Pyrene, L2). In this study, MA-COF, a three-dimensional COF, was prepared by self-assembly polymerization under solvothermal conditions with (L1) as the node and pyrene as the linker in the mixture of 1,2-dichlorobenzene/n-butanol (9:1 v/v, 1.5 mL) at 120° C. for 7 days (Scheme 1), MA-COF was isolated as yellow powder that was insoluble in common organic solvents. The formation of imine linkages in MA-COF was confirmed by Fourier-transform infrared (FT-IR). Meanwhile, a small molecule model compound CTP-M with similar structure was prepared for comparative analysis. It is shown by Fourier transform infrared spectroscopy (FT-IR) that the characteristic diffraction peaks of the amino group and the aldehyde group of MA-COF largely disappeared, and the characteristic peak of the —C═N— stretching band newly appeared at 1625 cm$^{-1}$ is fundamentally the same as that of the model compound CTP-M (FIG. 1B). The crystallinity of MA-COF was confirmed by powder X-ray diffraction (PXRD) analysis. As shown in FIG. 1A, the obvious diffraction peaks at 4.728, 7.065, 8.321, 9.535, 12.382 and 25.088 demonstrate that MA-COF has a high degree of crystallinity.

Example 2

Synthesis of 1,3,6,8-tetra(aminophenyl)pyrene

Another of the intermediate compounds, 1,3,6,8-tetra (aminophenyl)pyrene, can be prepared according to the following Scheme 2:

Scheme 2

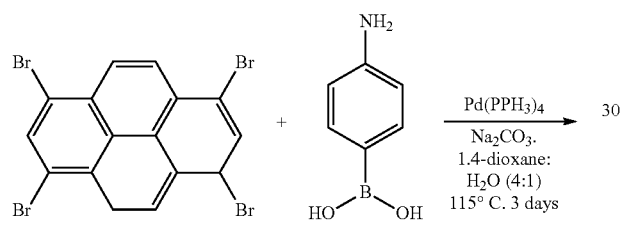

As shown in Scheme 2, a solution of 1,3,6,8-tetrabromopyrene (7.4 g, 14.3 mmol, 1.0 eq.), 4-aminophenylboronic acid pinacol ester (15 g, 68.5 mmol, 4.8 eq.), Na$_2$CO$_3$ (10.9 g, 15.7 mmol, 5.5 eq.) and Pd(PPh$_3$)$_4$ (1.65 g, 1.45 mmol, 10 mol %) in 32 mL 1,4-dioxane and 8 mL H$_2$O are heated to reflux (115° C.) for 3 days. After cooling to room temperature, H$_2$O is added. The resulting precipitate is collected via filtration and washed with H$_2$O and MeOH. Recrystallization from 1,4-dioxane, follow by drying under high vacuum, furnishes the title compound, co-crystallized with approximately 1.5 dioxane molecules per formula unit, as a bright yellow powder.

Example 3

Synthesis of phosphazene COF (MA-COF)

Phosphazene COF can be prepared according to the following Scheme 3:

Scheme 3

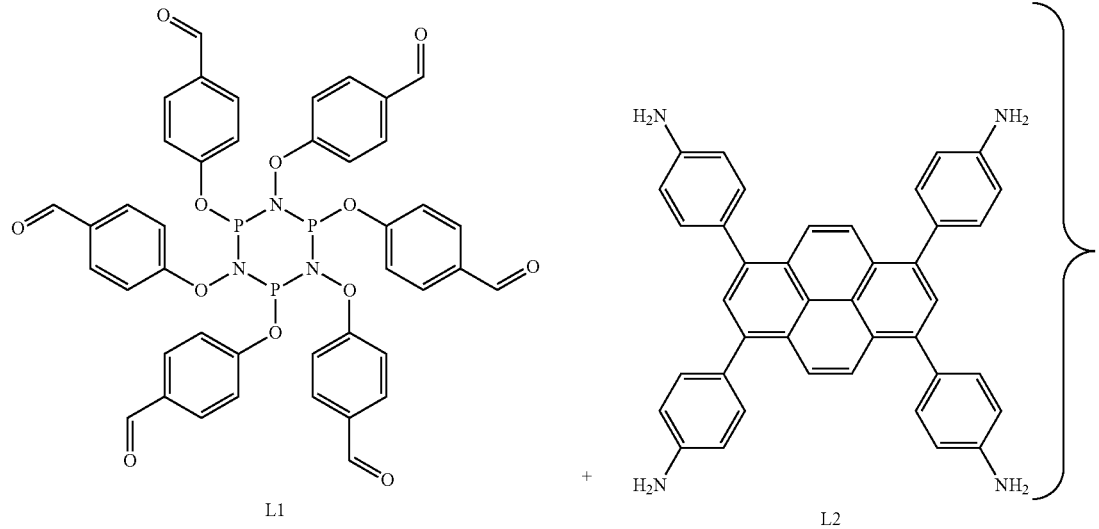

-continued
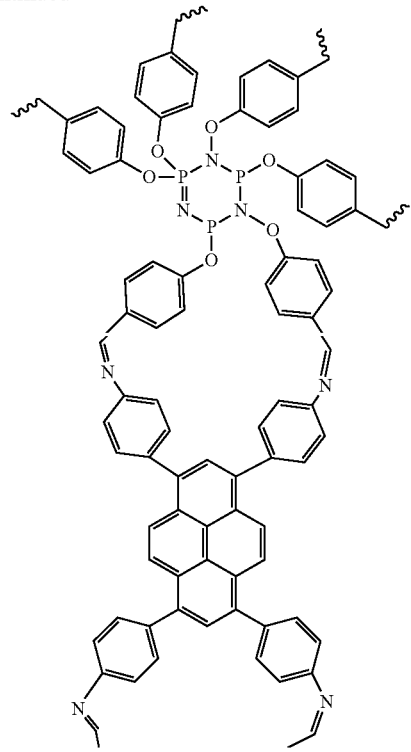
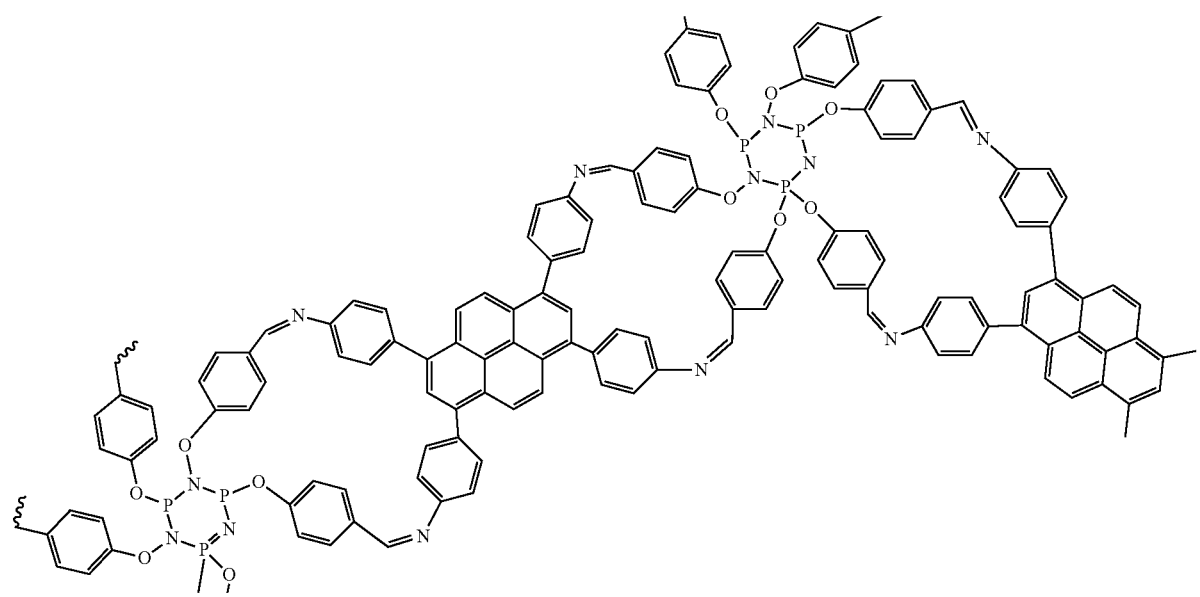
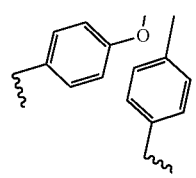

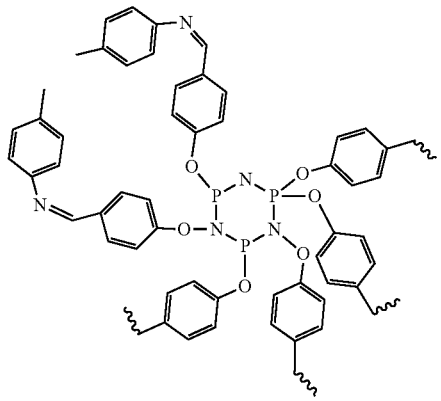

Hexa (4-formyl-phenoxy)cyclotriphosphazene (L1, 86 mg, 0.1 mmol) and 1,3,6,8-tetra(aminophenyl)pyrene (L4, 33 mg, 0.3 mmol) are placed in 15 mL pressure vessels, respectively, then 1,2-dichlorobenzene/n-butanol (9:1 v/v, 1.5 mL) is added and the two mixtures are sonicated for 5 min to afford homogeneous dispersions. Afterwards, the hexa(4-formyl-phenoxy)cyclotriphosphazene dispersion is added to the 1,3,6,8-tetra(aminophenyl)pyrene dispersion and the resultant suspension is briefly shaken (about 10 s). Subsequently, acetic acid (6 M, 0.3 mL) is slowly added and protected by nitrogen. The vessel is then sealed and left undisturbed for 7 days at 120° C. The solid is collected by filtration and washed with DMF, acetone, and THF separately. The powder is dried at 50° C. under vacuum overnight to afford a yellowish crystalline solid.

Hexa (4-formyl-phenoxy)cyclotriphosphazene was formed by the condensation of hexachlorocyclotriphosphazene and p-hydroxybenzaldehyde and has a unique stereoscopic structure in which the O—P—O plane (b plane) is perpendicular to the aromatic ring plane of cyclotriphosphazene $N_3P_3$ (a plane) (See Scheme 3). Because of the unique structure of hexa(4-formyl-phenoxy)cyclotriphosphazene, the as-prepared MA-COFs do not have a traditional 2D planar structure. Theoretically, to realize the construction of MA-COFs with a long-range ordered structure, there are mainly two connection configurations between hexa(4-formyl-phenoxy)cyclotriphosphazene and the C4-symmetric linker (Pyrene, 1,3,6,8-tetra(aminophenyl)pyrene).

MA-COF, a three-dimensional COF, was prepared by self-assembly polymerization under solvothermal conditions with hexa(4-formyl-phenoxy)cyclotriphosphazene as the node and the pyrene as the linker in the mixture of 1,2-dichlorobenzene/n-butanol (9:1 v/v, 1.5 mL) at 120° C. for 7 days (Scheme 1). MA-COF was isolated as a yellow powder that was insoluble in common organic solvents. The formation of imine linkages in MA-COF was confirmed by Fourier-transform infrared (FT-IR). Meanwhile, a small molecule model compound CTP-M with a similar structure was prepared for comparative analysis. It was shown by Fourier transform infrared spectroscopy (FT-IR) that the characteristic diffraction peaks of the amino group and the aldehyde group of MA-COF largely disappeared, and the characteristic peak of the —C=N— stretching band newly appeared at 1625 $cm^{-1}$ is fundamentally the same as that of the model compound CTP-M (FIG. 1B). The crystallinity of MA-COF was confirmed by powder X-ray diffraction (PXRD) analysis. As shown in FIG. 1A, the obvious diffraction peaks at 4.728, 7.065, 8.321, 9.535, 12.382 and 25.088 demonstrate that MA-COF has a high degree of crystallinity.

The porosity of MA-COF was determined by $N_2$ adsorption and desorption isotherms at 77 K (FIG. 2A). For each COF, a sharp uptake below $P/P°=0.05$ and a step, indicating the presence of mesopores. The Brunauer-Emmett-Teller (BET) specific surface areas were calculated to be 1135 $m^2$ $g^{-1}$. Furthermore, the pore volume was determined to be 1.83 $cm^3 g^{-1}$. The pore-size distribution curve shows that the average pore diameters are 1.38 nm and 1.73 nm, and the two sizes of pores are actually consistent with the triangular pores of 1.36 nm and 1.66 nm in the simulated wheel-shaped structure. (FIG. 2B).

Considering the application range of the material, the solvent stability and thermal stability of MA-COF was explored. Thermogravimetric analysis (FIG. 4B) shows that under a nitrogen atmosphere, MA-COF can maintain a stable structure at a high temperature of 420° C. In addition, the chemical stability of the MA-COF is also reflected in the material's good tolerance to solvents. Subsequently, at 25° C., MA-COF was soaked in different solutions for 24 days, including N,N-dimethylformamide (DMF), DMSO, ethanol, HCl (pH=1) aqueous solution, NaOH aqueous solution (pH=13), and boiling water. The solvent stability of MA-COF was characterized by PXRD. It can be seen from the comparison of FIG. 4A that the position and intensity of each diffraction peak of MA-COF before and after immersion in different solvents remained basically unchanged, which proves that it is stable in various solutions. Therefore, MA-COF exhibits excellent thermal and chemical stability.

Example 4

Iodine Capture

Iodine uptake experiments based on gravimetric measurements were performed using the following procedure. 10 mg of the MA-COF powder in an open glass Pyrex Beaker (2 mL) and 500 mg of iodine solids were placed in a sealed glass vial (50 mL) and heated at 75° C. and 1.0 bar using an oven. After adsorption of the iodine vapor for a while (0-24 h), the adsorbed COF powders will be cooled down to room temperature and weighed. The iodine uptake capacities for MA-COF were calculated by weight gain: $C_u=(W_2-W_1)/W_1 \times 100$ wt %, where $C_u$ is the iodine uptake capacity and $W_1$, $W_2$ are the mass weight of the MA-COF before and after adsorbed iodine vapor.

The mechanism of the iodine capture process by MA-COF mainly consists of a combination of physical and chemical adsorption. The FT-IR spectra of the MA-COF shows that the peak positions of the C=N bond, C=C/C—H bonds, and P=N/P—O—Ar bonds shift before and after adsorption, indicating chemical adsorption caused by the charge-transfer interaction between iodine and adsorbents. Raman spectroscopy of $I_2$@MA-COF was conducted, compared with MA-COF, and showed peaks at around 109 and 168 $cm^{-1}$ which can be attributed to the stretching vibrations of $I_3$ and $I_5$ anions, respectively. The generation of polyiodide ions confirmed the existence of chemical adsorption (FIGS. 3A and B).

$I_2$ capture in vapor: The iodine adsorption experiment was also conducted by exposing MA-COF to iodine vapor at 80° C. under ambient pressure. MA-COF exhibited a quick iodine uptake, showing a nearly linear increment then reaching adsorption saturation within 5 h. MA-COF showed iodine uptakes as high as 9.4 g $g^{-1}$ due to its 3D framework with higher specific surface areas and interconnected channels (FIG. 5A).

Example 5

Iodine Release

Iodine release and adsorbent recycling upon heating experiments were conducted as follows. A certain amount of iodine-equilibrium MA-COF@$I_2$ powder ($W_1$) was charged in an open glass Pyrex Beaker (2 mL) in an open glass vial (50 mL) and heated at 125° C. and 1.0 bar in an oil bath. The iodine release efficiency was calculated by weight gains: $Er=(W_1-W_t)/W_X \times 100$ $w_t$ %, where Er is the iodine release efficiency and $W_t$ is the mass weight of the MA-COF@$I_2$ after heating release (0-360 min). $W_X$ is the iodine mass weight in $W_1$.

UV-vis spectroscopy was performed to study iodine release from iodine-loaded samples. When the black crystals were soaked in anhydrous ethanol, the iodine released from the channels, and the solution gradually darkened to brown. Iodine release curves of $I_2$@MA-COF showed an increasing linear trend, with 73.6% of iodine released rapidly within 10 minutes, and 80.4% within 60 minutes (FIGS. 6A-B).

Example 6

$I_2$ Sorption in Solution

MA-COF powder was immersed into a closed vial containing a pre-prepared iodine elemental n-hexane solution (300 mg $L^{-1}$). The color of the initial solution changed from purple to colorless over time, indicating that MA-COF powder captured iodine from the n-hexane solution. Iodine sorption of MA-COF in $I_2$/cyclohexane solutions were studied by UV-vis spectroscopy at room temperature.

MA-COF powder was immersed into a closed vial containing a pre-prepared iodine elemental n-hexane solution (300 mg $L^{-1}$). The color of the initial solution changed from purple to colorless over time, indicating that MA-COF powder captured iodine from a n-hexane solution. Iodine sorption of MA-COF in $I_2$/cyclohexane solutions was studied by UV-vis spectroscopy at room temperature. The % removal efficiency was 97.3% (FIG. 5B).

Example 7

Recycling the COF Sample

The iodine-captured MA-COF sample was added to ethanol (20.0 mL) in a vial at 25° C., and ethanol was refreshed every 2 h until no color of the solution was observed. The MA-COF sample was collected by filtration, washed with ethanol, dried under vacuum at 120° C. overnight and reused for the next cycle.

Figure 7B:
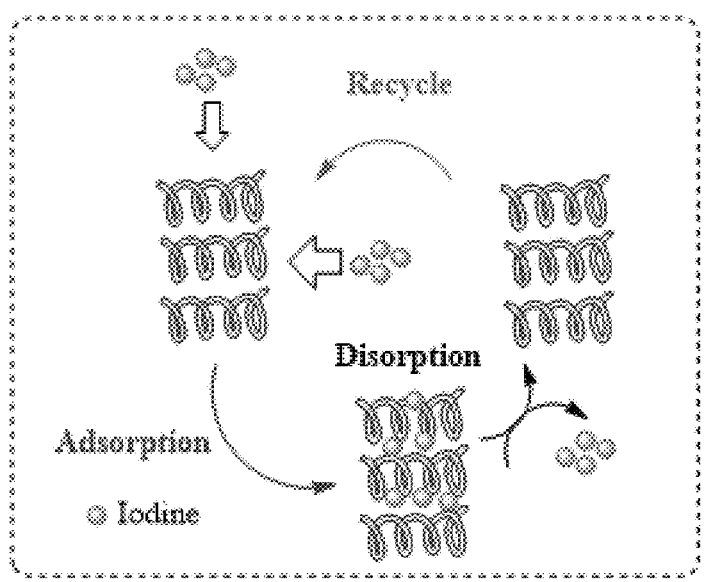
FIG. 7B shows a flow chart of how the MA-COF can be recycled.

In order to evaluate the reusability of adsorbents, the $I_2$@MA-COF was soaked in ethanol for 24 h and then centrifuged and dried at 85° C. for 12 h. The result shows that MA-COF can still maintain excellent adsorption for iodine after 5 cycles, suggesting that the porous structures were robust against oxidative iodine upon long-period exposure at high temperature (FIG. 7).

Figures 8A, 8B:
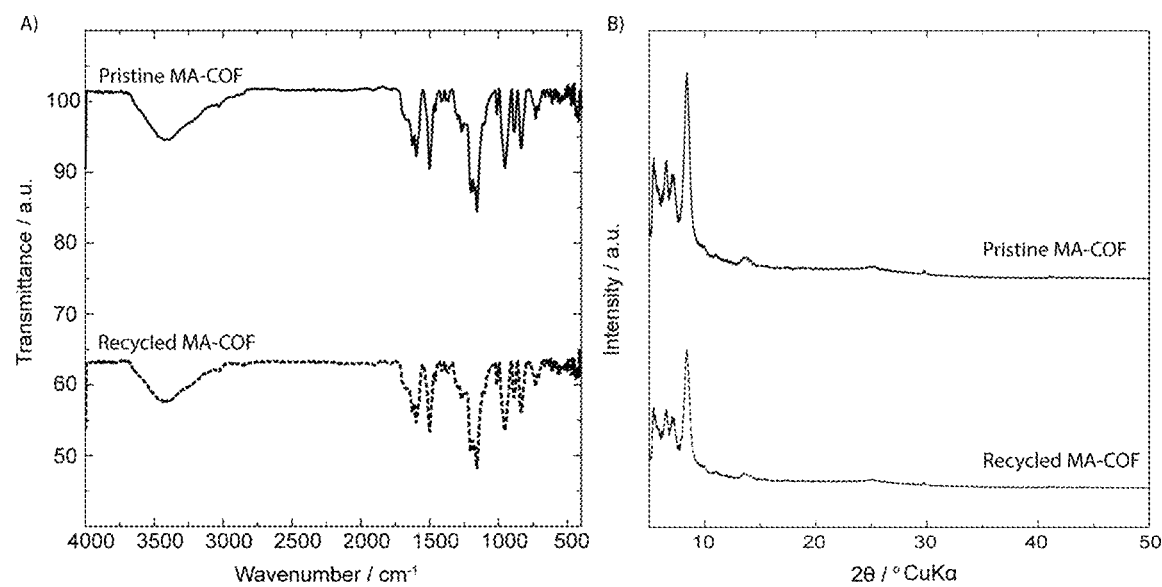
FIG. 8A shows an IR spectroscopy comparison of MA-COF before and after being recycled.
FIG. 8B shows a XRD comparison of MA-COF before and after being recycled.

After ethanol rinse, the MA-COF was recyclable and retained similar iodine uptakes. FT-IR spectroscopy verified the chemical integrity of the MA-COF after cycled application (FIG. 8A). The regenerated MA-COFs maintained their crystallinity, as evidenced by their unchanged PXRD pattern (FIG. 8B). These excellent cycling performances suggest that these materials are robust against oxidative iodine over long-term exposure.

Example 8

Comparison to Other COFs

The iodine uptakes of typical adsorbents were analyzed. The adsorption capacity of MA-COF (9.4 g $g^{-1}$) is far superior to those reported previously, such as 29-fold higher than that of the typical silver doped zeolite mordenite (Ag-MOR, 0.28 g $g^{-1}$), 32 two orders of magnitude higher than those of nonporous materials, and much better than those of representative porous materials, including zeolitic imidazolate framework-8 (ZIF-8, 1.20 g $g^{-1}$), porous aromatic framework (PAF-24, 2.76 g $g^{-1}$), azo-bridged porphyrin-phthalocyanine network (AzoPPN, 2.90 g $g^{-1}$) due to the synergistic effect of physical and chemical adsorption of iodine in MA-COF (Table 1).

It is to be understood that the phosphazene covalent organic framework is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:
1. A method for making a phosphazene covalent organic framework (MA-COF) comprising:
   obtaining a hexa(4-formyl-phenoxy)cyclotriphosphazene having the formula:

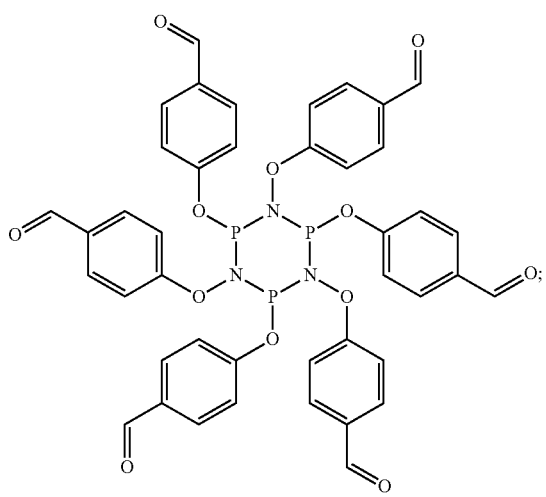 [SMILES: O=Cc1ccc(ON2P(Oc3ccc(C=O)cc3)N(Oc3ccc(C=O)cc3)P(Oc3ccc(C=O)cc3)N(Oc3ccc(C=O)cc3)P2Oc2ccc(C=O)cc2)cc1]

obtaining a 1,3,6,8-tetra(aminophenyl)pyrene having the formula:

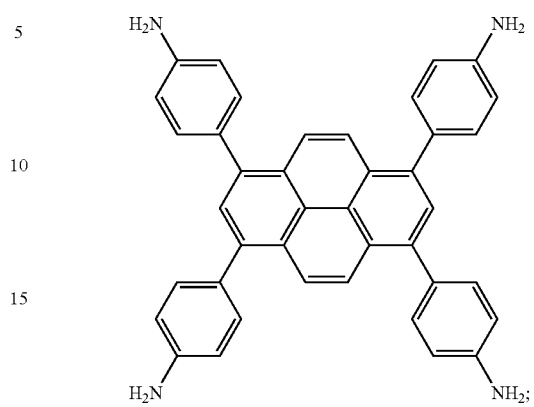

placing the hexa(4-formyl-phenoxy)cyclotriphosphazene and the 1,3,6,8-tetra(aminophenyl)pyrene in separate vessels, then adding a solvent to each respective vessel and sonicating each respective vessel to obtain a hexa (4-formyl-phenoxy)cyclotriphosphazene homogenous dispersion and a 1,3,6,8-tetra(aminophenyl)pyrene homogenous dispersion;
   adding the hexa(4-formyl-phenoxy)cyclotriphosphazene homogenous dispersion to the vessel containing the 1,3,6,8-tetra(aminophenyl)pyrene homogenous dispersion to obtain a suspension;
   adding acetic acid to the suspension and leaving the resulting mixture in an autoclave undisturbed for at least about 7 days at a temperature of about 110° C. to about 130° C. to obtain a solid;
   collecting the solid by filtration and drying the solid to obtain the phosphazene covalent organic framework (MA-COF) having the formula:

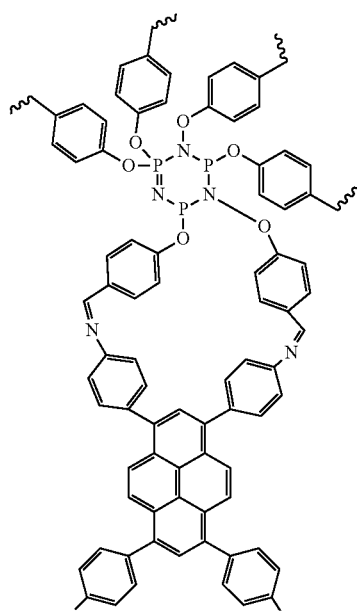

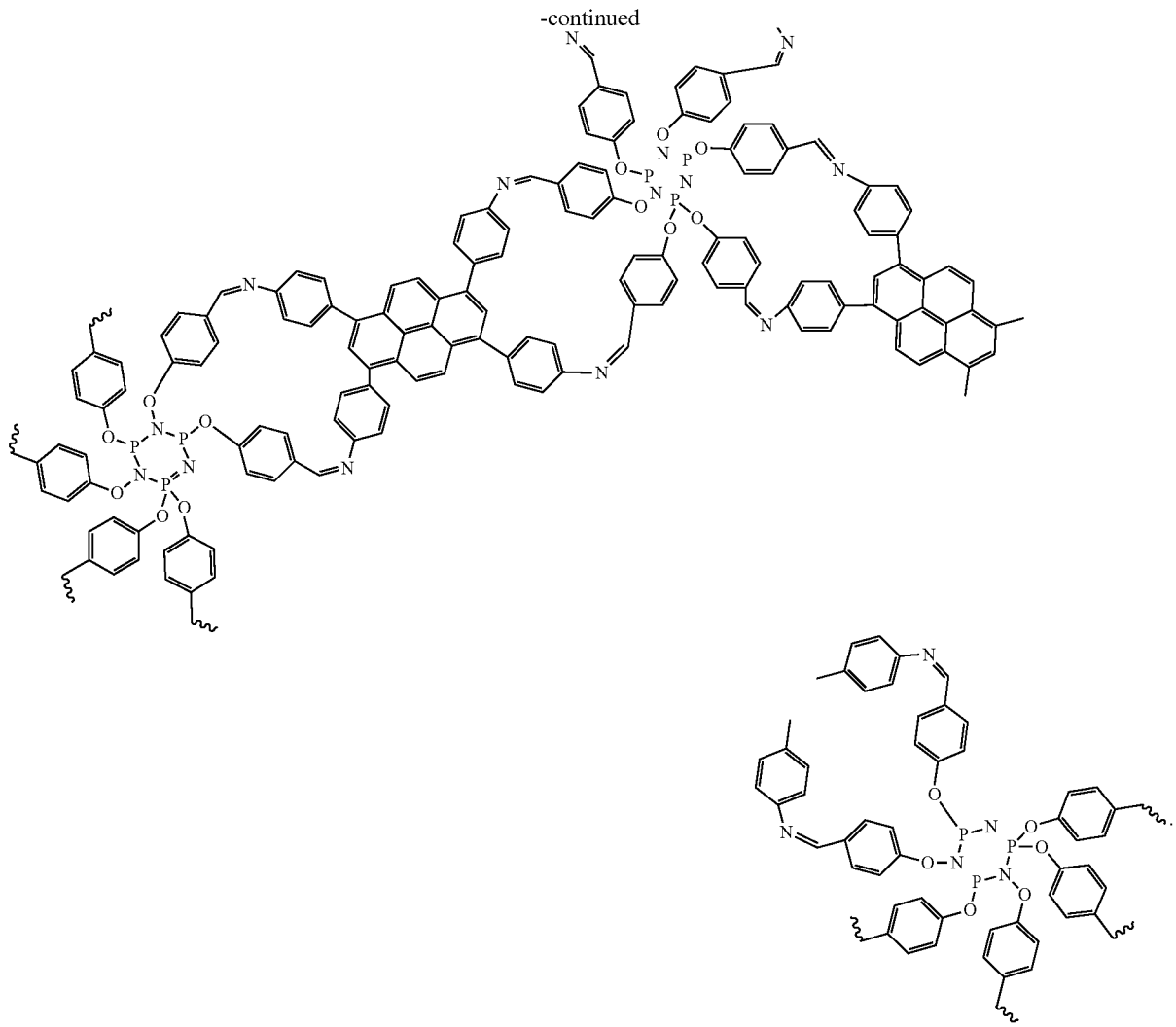

2. The method of claim 1, wherein the hexa(4-formyl-phenoxy)cyclotriphosphazene and the 1,3,6,8-tetra(aminophenyl)pyrene are used in an about 1:3 molar ratio.

3. The method of claim 1, wherein after the hexa(4-formyl-phenoxy)cyclotriphosphazene homogenous dispersion is added to the vessel containing the 1,3,6,8-tetra(aminophenyl)pyrene homogenous dispersion, acetic acid is also added to the vessel containing the 1,3,6,8-tetra(aminophenyl)pyrene homogenous dispersion.

4. The method of claim 1, wherein the solvent added to the respective vessels is 1,2-dichlorobenzene and n-butanol.

5. The method of claim 1, wherein the solid collected by filtration is washed with DMF, acetone, and THF separately before drying.

6. The method of claim 1, wherein the phosphazene covalent organic framework (MA-COF) is obtained as a yellowish crystalline solid.

7. The method of claim 1, wherein the hexa(4-formyl-phenoxy)cyclotriphosphazene is obtained by reacting p-hydroxybenzaldehyde and hexachlorocyclotriphosphazene.

8. The method of claim 7, wherein the p-hydroxybenzaldehyde and the hexachlorocyclotriphosphazene are separately dissolved in acetonitrile before being reacted with each other.

9. The method of claim 8, wherein the reaction of the p-hydroxybenzaldehyde and the hexachlorocyclotriphosphazene occurs for about 30 min at about 140° C. using microwave protocol.

10. The method of claim 1, wherein the 1,3,6,8-tetra(aminophenyl)pyrene is obtained by reacting 1,2,6,8-tetrabromopyrene with 4-aminophenylboronic acid pinacol ester.

11. The method of claim 10, wherein the reaction of the 1,2,6,8-tetrabromopyrene with 4-aminophenylboronic acid pinacol ester is conducted by preparing a solution of the 1,3,6,8-tetrabromopyrene and the 4-aminophenylboronic acid pinacol ester with $Na_2CO_3$ and $Pd(PPh_3)_4$ in 1,4-dioxane and water.

12. The method of claim 11, wherein the reaction of the 1,2,6,8-tetrabromopyrene with 4-aminophenylboronic acid pinacol ester occurs while the solution is heated to reflux for about three days.

* * * * *